(12) United States Patent
Currie et al.

(10) Patent No.: US 10,083,057 B1
(45) Date of Patent: Sep. 25, 2018

(54) MIGRATION OF ACTIVE VIRTUAL MACHINES ACROSS MULTIPLE DATA CENTERS

(71) Applicant: EMC IP Holding Company LLC, Hopkinton, MA (US)

(72) Inventors: John Currie, Chapel Hill, NC (US); Daniel E Mitchell, Jr., Ashland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 15/083,843

(22) Filed: Mar. 29, 2016

(51) Int. Cl.
*G06F 9/455* (2018.01)

(52) U.S. Cl.
CPC ...... *G06F 9/45558* (2013.01); *G06F 9/45533* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,250,574 B2* | 8/2012 | Baba | ............... | G06F 9/505 718/1 |
| 8,429,362 B1* | 4/2013 | Natanzon | ............ | G06F 11/1471 711/161 |
| 8,429,630 B2* | 4/2013 | Nickolov | .............. | G06F 9/4856 717/110 |
| 8,527,990 B1* | 9/2013 | Marathe | ............... | G06F 9/45558 718/1 |
| 8,549,519 B2* | 10/2013 | Emaru | ................. | G06F 3/0607 718/1 |
| 8,667,490 B1* | 3/2014 | van der Goot | ..... | G06F 9/45558 711/162 |
| 8,689,054 B1* | 4/2014 | van der Goot | ..... | G06F 11/1438 714/43 |
| 8,726,067 B1* | 5/2014 | van der Goot | ......... | G06F 11/00 714/4.11 |
| 8,832,498 B1* | 9/2014 | Jain | ................... | G06F 17/30017 714/25 |
| 8,850,144 B1* | 9/2014 | Natanzon | ................ | G06F 11/20 711/162 |

(Continued)

OTHER PUBLICATIONS

Mashtizadeh et al., "XvMotion: Unified Virtual Machine Migration over Long Distance"; Jun. 19-20, 2014, USENIX ACT '14 (xvmotion_2014.pdf; p. 1-13).*

(Continued)

*Primary Examiner* — Hiren Patel
(74) *Attorney, Agent, or Firm* — Staniford Tomita LLP (57) ABSTRACT

A method of providing migration of active virtual machines by performing data migrations between data centers using distributed volume and stretched cluster mechanisms to migrate the data synchronously within the distance and time latency limits defined by the distributed volume protocol, then performing data migrations within data centers using local live migration, and for long distance data migrations on a scale or distance that may exceed synchronous limits of the distributed volume protocol, combining appropriate inter- and intra-site data migrations so that data migrations can be performed exclusively using synchronous transmission.

14 Claims, 5 Drawing Sheets

(56) References Cited

U.S. PATENT DOCUMENTS

| | | | | |
|---|---|---|---|---|
| 8,856,257 B1* | 10/2014 | Zhang | ................. | G06F 11/3006 |
| | | | | 709/207 |
| 9,032,160 B1* | 5/2015 | Natanzon | ................ | G06F 11/14 |
| | | | | 711/135 |
| 9,098,200 B2* | 8/2015 | Nakajima | .............. | G06F 3/0605 |
| 9,348,627 B1* | 5/2016 | Palekar | ..................... | G06F 9/46 |
| 9,477,506 B2* | 10/2016 | Wang | ..................... | G06F 9/5088 |
| 9,632,809 B2* | 4/2017 | Nakashima | ......... | G06F 9/45558 |
| 9,639,277 B2* | 5/2017 | Nakajima | ............... | G06F 3/061 |
| 9,753,761 B1* | 9/2017 | Palekar | ............... | G06F 9/45558 |
| 2011/0145380 A1* | 6/2011 | Glikson | ................ | G06F 9/4856 |
| | | | | 709/223 |
| 2012/0137285 A1* | 5/2012 | Glikson | ................ | G06F 9/4856 |
| | | | | 718/1 |
| 2013/0047153 A1* | 2/2013 | Emaru | .................. | G06F 3/0607 |
| | | | | 718/1 |
| 2013/0198476 A1* | 8/2013 | Nakajima | ............. | G06F 3/0607 |
| | | | | 711/165 |
| 2014/0359134 A1* | 12/2014 | Yoshida | ................ | G06F 9/4856 |
| | | | | 709/226 |
| 2014/0359616 A1* | 12/2014 | Nakashima | ......... | G06F 9/45558 |
| | | | | 718/1 |

OTHER PUBLICATIONS

Feng et al., "An Acceleration System for Long Distance Live Migration of Virtual Machine"; Proceedings of COIN2012, (Feng_2012.pdf; pp. 1-2).*

* cited by examiner

MIGRATION OF ACTIVE VIRTUAL MACHINES ACROSS MULTIPLE DATA CENTERS

TECHNICAL FIELD

Embodiments are generally directed to virtualized compute and storage systems, and more active migration of active virtual machines across multiple data centers.

BACKGROUND

Shared storage represents local storage on a single site shared amongst compute servers on the site, while distributed storage represents local storage on multiple sites that is assembled together by storage virtualization hardware and software so that it can be shared amongst compute servers on multiple sites. It is differentiated from replicated storage by the fact that all copies are active and can be written to simultaneously, where replicated storage represents local storage on multiple sites (typically exactly two sites) that is configured as an active/standby pair where only the active member can be modified and where there is replication hardware and/or software that acts to keep the standby member in sync with the active member.

Distributed storage is a key feature in large-scale multi-site storage systems that allows multiple different data centers to all access network storage media as if it is local storage, and without the need to duplicate files in their individual computers. Such a storage device typically has multiple ports or means to identify and track multiple sessions in a single port. Cloud computing networks use virtual data centers comprising large numbers of virtual machines (VMs) utilize virtual storage through server virtualization products, such as VMware's vSphere. This allows the system to store virtual machine disk images, including snapshots, and multiple servers can read/write the same file system simultaneously while individual virtual machine files are locked.

In present replicated storage systems, the migration of virtual machines between two virtual data centers typically requires that workloads on the virtual machines are inaccessible during the migration process. This represents an active/passive data storage system in which the data may be accessible to both sides of two data centers through the shared storage, however data written by one data center is not accessible to the other data center until a certain period of time after the data is written (asynchronous replication) and such time as the passive copy is declared 'active' and the active copy is declared 'passive' and the direction of replication between the two sites is reversed.

Continuous-availability (CA) architectures improve the high-availability model by allowing the data to be available at all times. Thus, a CA system can migrate active workloads running between data centers without any downtime. This has enabled the advent of active/active storage presentation for a single active LUN (logical unit number) in a read/write state that exists in two separate locations. In an active/active system, storage is shared by on-line and running servers at two locations on separate physical storage arrays. The VPLEX Metro cluster provided by EMC Corporation represents an active/active architecture that stretches simultaneous read/write access to storage across sites. This system implements a distributed storage volume to servers at multiple sites to effectively make the operating system (OS) or Hypervisor layer believe that the active/active volumes distributed across the sites are local volumes. These distributed volumes can then be utilized to enable assembling compute servers from multiple sites into a single "stretched" cluster such that the compute servers on both sites are members of a single virtualized compute cluster without any restrictions in regards to physical site boundaries. Virtualization technology thus allows the server OS to treat all cluster members as if they exist at the same site. VPLEX, and other similar local and distributed storage federation platform systems allows data stored on storage arrays to be accessed and shared locally, or within, between and across data centers over local and metro distances. This creates a CA solution where applications and data are always available through data and application movements, disasters and data migrations.

Present cluster sizes supported by active/active systems are generally limited to metropolitan-scale distances, such as for the EMC VPLEX Metro platform. In this case, distances supported by the stretched cluster architecture are limited to an order of 100 kilometers or so. This is sufficient for many intra-regional data center distributions, but is not adequate for more typical inter-regional distributions, such as when data centers are physically located in different states or different countries, or between any two data centers that are farther than 100 kilometers apart. In such cases, data migration between the two distant data centers must revert back to the active/passive architecture to migrate data over these distances.

What is needed, therefore, is a way to implement active/active data migration for virtual data centers over very long distances, such as in excess of 100 kilometers.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC VPLEX, and VPLEX Metro are trademarks of EMC Corporation; vSphere Metro Storage Cluster, and vMotion are trademarks of VMware Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data backup/recovery and data migration techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Some embodiments of the invention involve database management and automated backup/recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
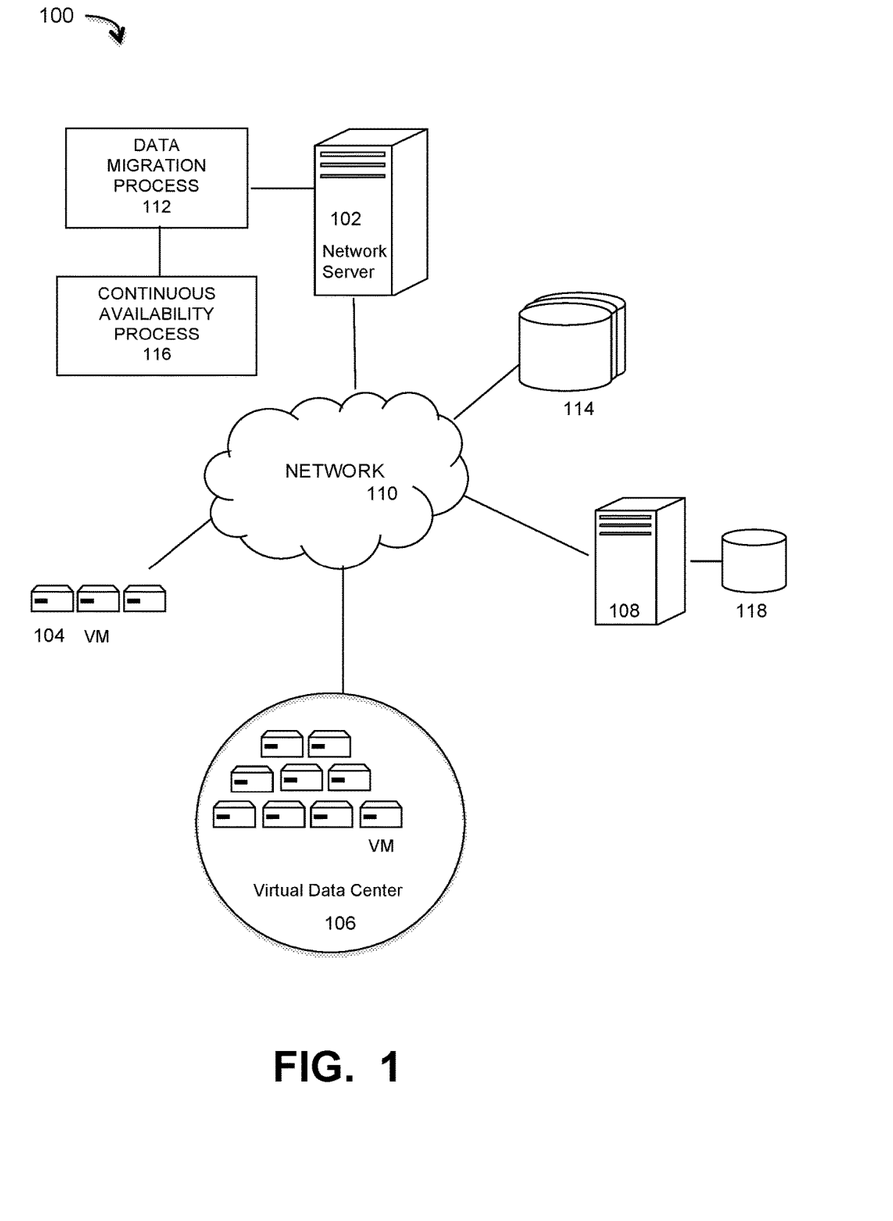
FIG. 1 is a diagram of a virtualized network implementing active migration of virtual machines under some embodiments.

FIG. 1 illustrates a computer network system 100 that implements one or more embodiments of a continuous availability data migration process for virtual machine (VM) networks. Target VMs may also be organized into one or more virtual data centers 106 representing a physical or virtual network of many virtual machines (VMs), such as on the order of thousands of VMs each. The data sourced by the data source may be any appropriate data, such as database data that is part of a database management system. In this case, the data may reside on one or more hard drives (118 and/or 114) and may be stored in the database in a variety of formats (e.g., XML or RDMS). Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

In an embodiment, system 100 represents a data migration system that migrates virtual machines running in the data centers from one physical data center to another one on another site. The data migration process 112 is used in conjunction with a continuous availability process 116 that allows for data to be migrated among data centers including system 100 in a manner such that active VM workloads can be moved without any downtime or need to suspend VM read/write (R/W) operations during the migration.

In an embodiment, system 100 implements a VPLEX platform that uses a distributed virtual volume as the network storage media. In general, a VPLEX system is built as a cluster, and each cluster can consist of one, two, or four highly available and fully redundant enterprise engines. Each cluster, regardless of the number of engines, supports up to e.g., 8,000 virtual volumes. Each cluster configuration includes the required power, management server, and network connectivity. The VPLEX Cluster resides between servers and fiber channel heterogeneous storage arrays (abstracting the storage subsystem from the host). It provides a consistent view of one or more LUNs across VPLEX clusters separated either by a few feet within a data center or across synchronous distances, enabling new models of high availability and workload relocation.

It also utilizes a stretched cluster mechanism that allows system 100 to share data with other data centers and share the same data in two separate locations that are accessible simultaneously from both locations. In general, a stretched cluster is a deployment model in which two or more virtualization host servers are part of the same logical cluster but are located in separate geographical locations. In a stretched cluster the servers act as a single system to provide high availability and load balancing despite not being located in the same facility. A stretched cluster offers the advantage of enabling easy migration of VMs from one geographic location to another while maintaining network connections with the other servers within the cluster. Stretched clusters are especially useful in disaster avoidance situations where a data center in one location is expected to be hit. In this case, critical virtual machines could be migrated to servers within the stretched cluster that are physically located in a different facility. Examples of the stretched cluster mechanism include Stretched VMware Clusters, and Oracle Real Application Clusters (RAC), among others. In general, the term "disaster recovery" may refer to active/passive protection (i.e., the workload gets restarted on the remote site from replicated data), and the term "disaster avoidance" may refer to pre-emptively migrating active virtual machines using stretched clusters and VPLEX distributed volumes.

Figure 2:
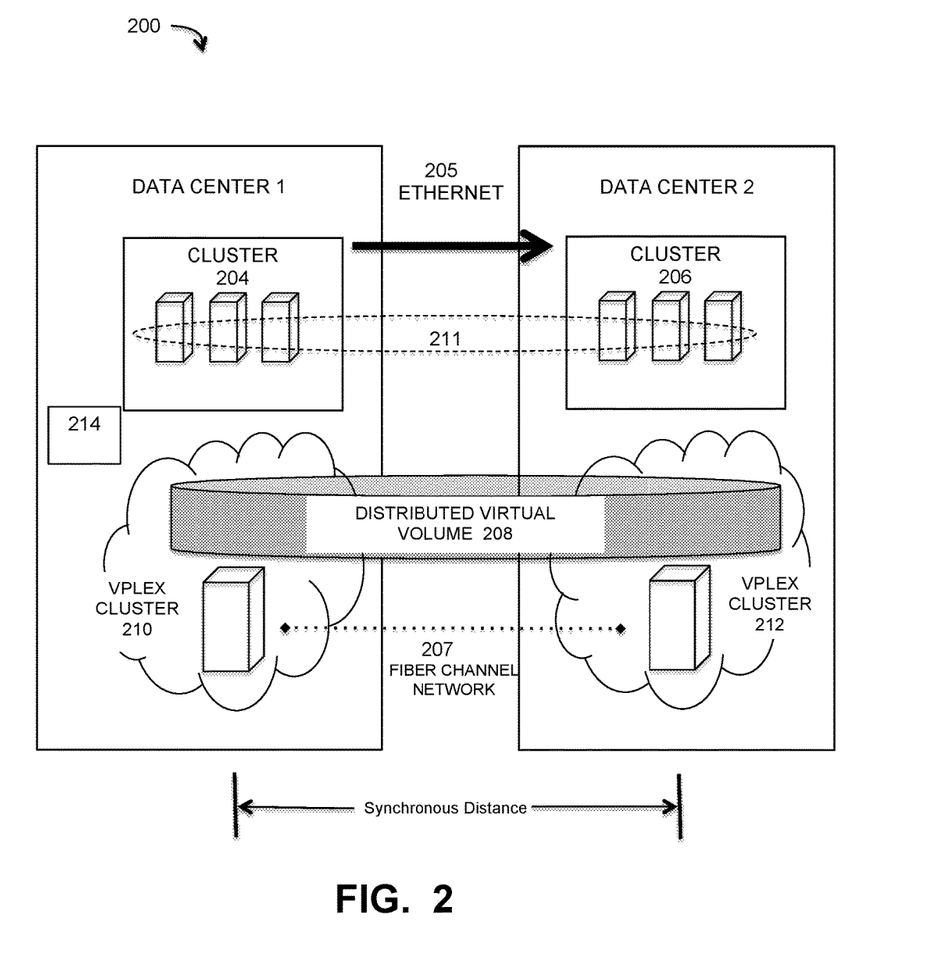
FIG. 2 illustrates a distributed virtual volume that implements a continuous availability system for migration of active VM data centers under some embodiments.

FIG. 2 illustrates a distributed virtual volume that implements a continuous availability system for migration of active VM data centers under some embodiments. As shown in diagram 200, a first data center, data center 1 includes a hypervisor cluster 204 that includes virtualized servers, such as VMware ESX servers, or similar compute servers; and data center 2 includes a hypervisor cluster 206. The two virtualized server clusters 204 and 206 may be coupled to one another over a network link such as Ethernet link 205. Both data centers also maintain respective VPLEX clusters 210 and 212 that are coupled together over a fiber channel network 207. Each VPLEX cluster may represent a local VPLEX implementation for a single data center. This federates storage arrays and provides single point management to simplify data movement between arrays and tiers of storage within each of the data centers 1 and 2.

For the embodiment of FIG. 2, system 200 also implements a stretched cluster mechanism, such as provided by the VMware vSphere Metro Storage Cluster, or similar platforms. This stretched cluster mechanism provides a basis to establish a distributed virtual volume between data centers 1 and 2. In the stretched cluster model shown in FIG. 2, the physical servers that make up 204 and 206 are combined into a single hypervisor cluster 211. Stretched clustering, also called distributed clustering, allows system 200 to move VMs between data centers 1 and 2 for failover or proactive load balancing, or other similar data migration functions. This configures the system for disaster avoidance in environments where downtime cannot be tolerated. In general, stretched cluster support requires active site balancing and very high availability standards, as well as a high bandwidth, low latency connection between the two sites. Current stretched cluster platforms may be limited to certain practical limits, such as a maximum supported network latency between the two sites being on the order of a 10 milliseconds round-trip time, which limits the geographic distance in which a stretched cluster will work to less than 100 kilometers, in most cases. As shown in FIG. 2, the link 207 is a fiber channel link, such as Fibre Channel (FC), iSCSI, network file system (NFS) and Fibre Channel over Ethernet (FCoE) protocols.

In an embodiment, system 200 represents VPLEX Metro system in which the distance between the data center 1 and data center 2 are on the order of metropolitan distances (e.g., approximately 50 to 100 kilometers or 30 to 60 miles). VPLEX Metro extends the benefits of the VPLEX local clusters of each data center by allowing users to transparently relocate data and applications over distance, protect their datacenter against disaster, workload re-balancing and enable efficient collaboration between sites. All of the storage in both data centers can be managed from that same management point. The VPLEX distributed cache architecture allows both clusters 210 and 212 to present the same distributed volumes 208 to servers 204 and 206 in both sites. All reads are serviced locally (e.g., data center 1) while writes are synchronously mirrored to the remote site (e.g., data center 2). Users can mirror data to a second site and can access it there also, at near local speeds. VPLEX Metro implements or supports Fibre Channel over IP between the two clusters, and for IP connectivity, the inter-cluster connectivity is UDT (UDP-based data transfer) over IP. An interface for this connection may be a 10 Gigabit Ethernet LC fiber port from each VPLEX director into the user's WAN environment.

In an embodiment, system 200 includes a module 214 that allows VMs in a metro storage cluster to be live migrated between data sites 1 and 2. An example of such a module is the VMware vMotion, though embodiments are not so limited. This module enables the live migration of running virtual machines from one physical server in server group 204 to another server in server group 206 (since 204 and 206 are members of the stretch cluster 211) with zero downtime, continuous service availability, and complete transaction integrity. It operates by first encapsulating the entire state of a virtual machine by a set of files stored on shared storage. A clustered VM file system (e.g., VMware VMFS) allows multiple installations of a compute server 204 to access the same virtual machine files concurrently. Second, the active memory and precise execution state of the virtual machine is rapidly transferred over a high-speed network 205. This allows the virtual machine to instantaneously switch from running on the source server 204 to the destination server 206. Module 214 keeps the transfer period imperceptible to users by keeping track of on-going memory transactions in a bitmap. Once the entire memory and system state has been copied over to the target server 206, it suspends the source virtual machine, copies the bitmap to the target server and resumes the virtual machine on the target server. The networks used by the virtual machine are also virtualized by the underlying server 204. This ensures that even after the migration, the virtual machine network identity and network connections are preserved. Module 214 manages the virtual MAC address as part of the process. Once the destination machine is activated, it pings the network router to ensure that it is aware of the new physical location of the virtual MAC address. Since the migration of a virtual machine preserves the precise execution state, the network identity, and the active network connections, the result is zero downtime and no disruption to users.

Under current system implementations, synchronous distances between sites may be limited by the round trip latency. For example, VPLEX Metro using synchronous protocols may be limited to on order of a 5 ms round trip latency. This generally satisfies the needs for metro links on the order of up to 100 km distance. For longer distances, these physical network constraints are not sufficient. In an embodiment, system 200 includes a repeater function or component to increase the distance of the stretched cluster mechanism to beyond VPLEX Metro limitations.

Figure 3:
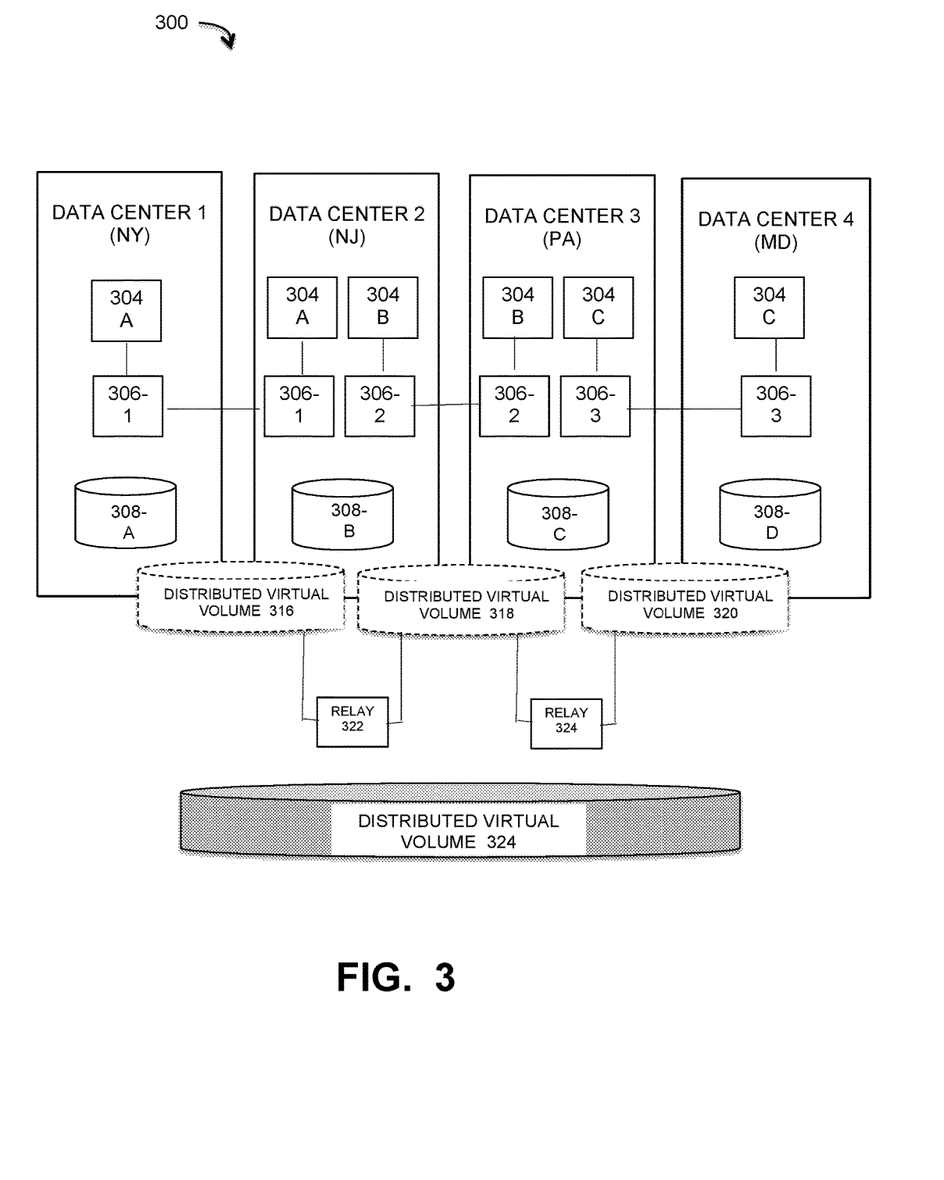
FIG. 3 illustrates a very large-scale network implementing migration of active virtual machines under some embodiments.

FIG. 3 illustrates a very large-scale network implementing migration of active virtual machines under some embodiments. Network system 300 of FIG. 3 illustrates at least part of a network spanning very large distances over a geographic region such as the United States. Four different example data centers are shown as located in separate physical locations, such as data center 1 in New York (N.Y.), data center 2 in New Jersey (NJ), data center 3 in Pennsylvania (PA), and data center 4 in Maryland (MD). The distance between any pair of data centers may be on the order of 60 km to 100 km, thus allowing the use of VPLEX Metro scale links. The distance between two non-contiguous data centers however may be much longer, such as on the order of 100 km or more, thus exceeding the synchronous distance of VPLEX Metro, and requiring asynchronous data migration links. The composition and topography of network 300 is primarily intended for example only, and any other network configuration is possible.

Each data center comprises a number of compute resources 304, such as virtualized (e.g., ESX) computer servers or server clusters, VPLEX Metro server 306, and local storage devices 308. Thus, for the example embodiment of FIG. 3, data center 1 includes server cluster 304A, VPLEX server 306-1 and storage 308A; data center 2 includes server cluster 304B, VPLEX server 306-2 and storage 308B; data center 3 includes server cluster 304C, VPLEX server 306-3 and storage 308C; and data center 4 includes storage 308D. Within each data center and at least between some contiguous data centers, synchronous migration using VPLEX Metro and stretched clusters may be used. At least some distances between data centers, however, are too far for synchronous data migration (e.g., between NY data center 1 and MD data center 4), and VM workloads would need to be shutdown for these transfers. To migrate data continuously and synchronously while keeping all source and target VMs active, a series synchronous migrations is performed using certain data centers or pairs of data centers that function as relay or repeater stations 322 and 324.

For the example embodiment of FIG. 3, data is migrated between data center 1 and data center 2 using VPLEX Metro distributed volumes and stretched clusters (e.g., vSphere stretched clusters) for live migration of the workload. Thus, server cluster 304A and distributed volume 306-1 appear in both data center 1 and data center 2, with a shared distributed virtual volume 316. Within data center 2, the workload is migrated from server cluster 304A to server cluster 304B and from distributed volume 306-1 to distributed volume 306-2 using local live migration modules, such as VMware vMotion and VMware Storage vMotion. Between data center 2 and data center 3, VPLEX Metro and stretched clusters can be used to migrate data, such that server cluster 304B and distributed volume 306-2 appear in both data centers through a distributed virtual volume 318. Within data center 3, the workload is migrated from server cluster 304B to server cluster 304C and from distributed volume 306-2 to distributed volume 306-3 using local live migration modules, such as VMware vMotion and VMware Storage vMotion. From data center 3 to data center 4, VPLEX Metro and stretched clusters can be used to migrate data, such that server cluster 304C and distributed volume 306-3 appear in both data centers through a distributed virtual volume 320.

For multi-site moves, the combined data migration methods set up pairs of migratable clusters that are used as relay stations to orchestrates a series of leapfrog moves across VPLEX Metro systems to provide continuous availability pairs that enable instantaneous availability across multiple sites (data centers), coupled with intra-site data migration using a local live migration module. Thus, as shown in FIG. 3, combinations of these data migration mechanisms produces an effective distributed virtual volume 324 that spans the entire length of the network. Within this span, data can be migrated synchronously such that VM workloads do not need to be shutdown during the migration process, even if the overall span exceeds the synchronous span limit of the distributed volume protocol or standard, such as VPLEX Metro.

Figure 4:
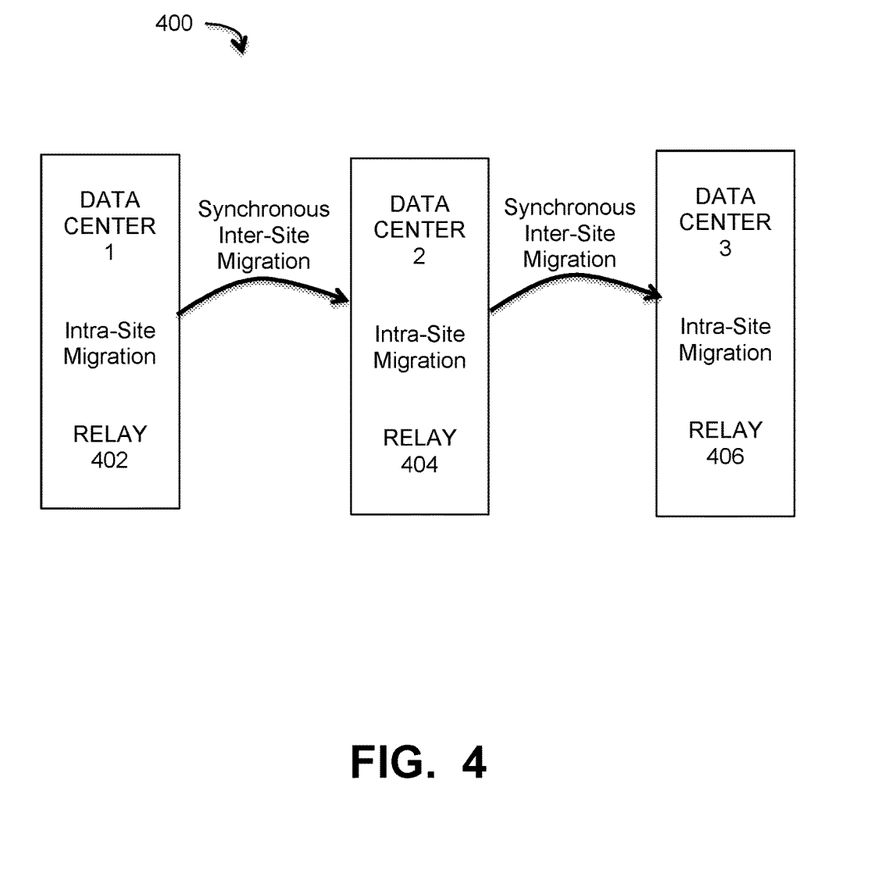
FIG. 4 illustrates a network system implementing a series of intra- and inter-site data migrations between relay stations to provide migration of active virtual machines under some embodiments.

FIG. 4 illustrates a network system implementing a series of intra- and inter-site data migrations between relay stations to provide migration of active virtual machines under some embodiments. As shown in diagram 400, three data centers (data center 1, data center 2, data center 3) are separated over a very large distance, such that the distance between at least data center 1 and data center 3 exceeds 100 kilometers. Each data center comprises compute servers that belong to a stretched server cluster and a distributed volume, such as illustrated in FIG. 2. The data migration within each data center utilizes local live migration modules, such as VMware vMotion and VMware Storage vMotion to produce intra-site migration. The data migration between data centers utilizes synchronous inter-site migration through the use of VPLEX Metro and stretched data center mechanisms, such as VMware vSphere virtualization. Each data center or pair of data centers acts as a relay 402 such that intra-site migrations within or between a data center provide links to inter-site migrations that can be performed synchronously. In this manner, the network topography and combination of intra- and inter-site data migration methods allows for data migrations between data centers separated by very large distances to be performed via an orchestrated series of synchronous data migrations.

Figure 5:
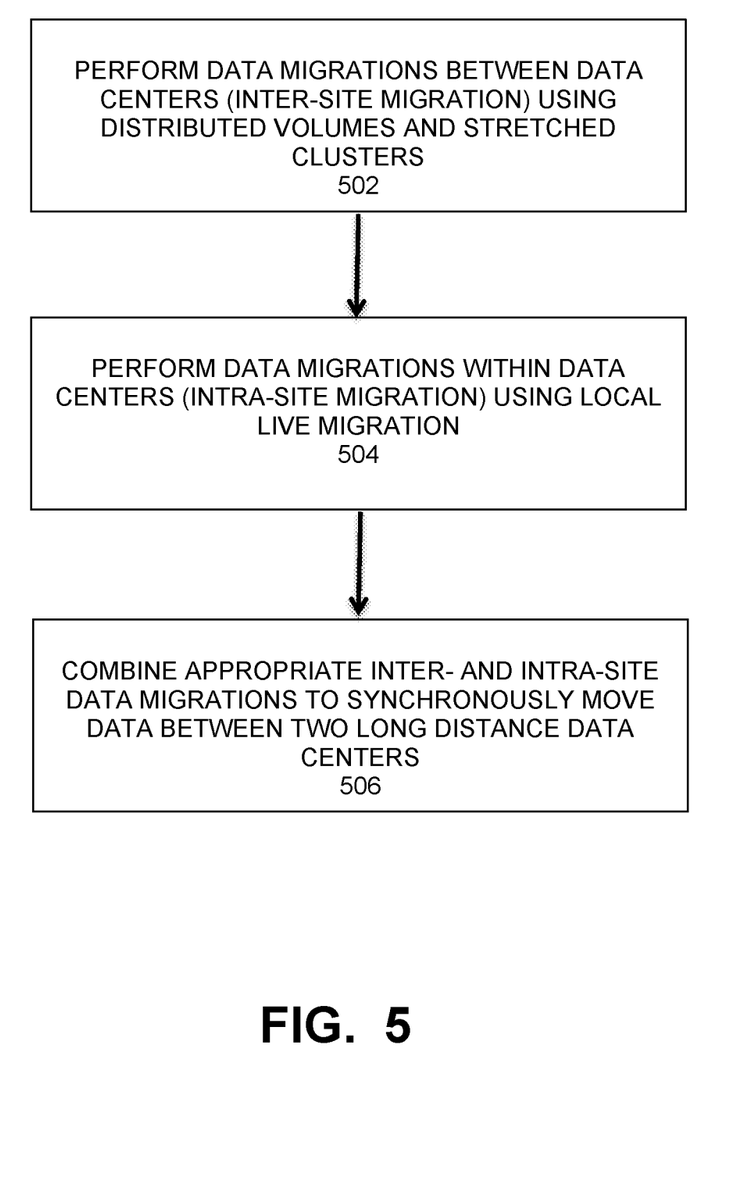
FIG. 5 is a flowchart illustrating a method of providing migration of active virtual machines under some embodiments.

FIG. 5 is a flowchart illustrating a method of providing migration of active virtual machines under some embodiments. The process of FIG. 5 involves performing data migrations between data centers using distributed volume and stretched cluster mechanisms to migrate the data synchronously within the distance and time latency limits defined by the distributed volume protocol, step 502. In an embodiment, the distributed volume mechanism comprises an EMC VPLEX Metro system, and the stretched volume mechanism comprises the VMware vSphere virtualization system, though embodiments are not so limited.

In step 504, the method performs data migrations within data centers using local live migration. In an embodiment, the local live migration mechanism comprises a VMware vMotion and Storage vMotion system, though embodiments are not so limited.

For long distance data migrations on a scale or distance that may exceed synchronous limits of the distributed volume protocol, appropriate inter- and intra-site data migrations are combined so that data migrations can be performed exclusively using synchronous transmission, step 506. In an embodiment, certain routing optimization, load balancing, or least distance algorithms may be used in the combining step 506 to optimize the combination of intra- and inter-site data migrations to perform synchronous migration between two selected data centers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Aspects of the methods, processes, and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Method and process steps may be executed by server or client side components that are processor-based components, programmed digital circuits, programmed arrays, and so on. Method steps may also be embodied as executable program code executed in a processor based system, such as a server computer or client computer coupled in a network. The terms, "component," "module," "procedure," "unit," and "engine" may all refer to a circuit that executes program code to perform a function implemented in software. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for performing multi-site migration of active virtual machines, comprising:
  performing inter-site data migrations among a plurality of data centers separated by metropolitan-scale distances using a distributed volume system and a stretched cluster system to migrate the data synchronously within a distance and time latency limits defined by the distributed volume protocol;
  wherein the distributed volume system comprises a clustered system using a distributed virtual volume as network storage media for the data migrations, wherein a cluster comprises a plurality of highly available and fully redundant enterprise-scale backup engines, each supporting on the order of thousands of virtual volumes that are accessible by all data centers of the plurality of data centers;
  wherein the inter-site data migrations are performed by setting up distributed virtual volumes between pairs of data centers of the plurality of data centers to form migratable data clusters, and deploying pairs of migratable clusters as relay stations between each pair of distributed virtual volumes to link three data centers through the pair of distributed virtual volumes;
  performing intra-site data migrations within each data center of the data centers using local live migration; and
  combining the inter-site data migrations using the migratable cluster relay stations and the intra-site data migrations such that that data migrations among the plurality of data centers can be performed exclusively using synchronous transmission even if a distance between source and target data centers exceeds synchronous limits of the distributed volume protocol.

2. The method of claim 1 wherein the stretched volume system comprises a metro-scale virtualization system for storage clusters of the clustered system.

3. The method of claim 2 wherein the local live migration comprises a system encapsulating an entire state of a virtual machine by a set of files stored on the network storage media and transferring an execution state of the virtual machine rapidly from a source computer server to a destination server computer.

4. The method of claim 1 wherein the distributed virtual volumes between pairs of data centers of the plurality of data centers effectively form a single distributed virtual volume accessible by all data centers of the plurality of data centers.

5. The method of claim 1 wherein the synchronous limits comprise at least one of a distance exceeding 100 kilometers, or a round-trip time of data transfer in excess of 10 milliseconds.

6. The method of claim 1 further comprising performing at least one routing optimization, load balancing, or least distance algorithm to optimize the combining of the inter-site and intra-site data migrations.

7. A system configured to perform multi-site migration of active virtual machines in a large-scale network, comprising:
a plurality of physical storage devices configured to store data of the active virtual machines during the multi-site migration;
a backup server computer coupled to the physical storage devices performing inter-site data migrations among a plurality of data centers separated by metropolitan-scale distances using a distributed volume system and a stretched cluster system to migrate the data synchronously within a distance and time latency limits defined by the distributed volume protocol;
wherein the distributed volume system comprises a clustered system using a distributed virtual volume as network storage media for the data migrations, wherein a cluster comprises a plurality of highly available and fully redundant enterprise-scale backup engines, each supporting on the order of thousands of virtual volumes that are accessible by all data centers of the plurality of data centers; and
wherein the inter-site data migrations are performed by setting up distributed virtual volumes between pairs of data centers of the plurality of data centers to form migratable data clusters, and deploying pairs of migratable clusters as relay stations between each pair of distributed virtual volumes to link three data centers through the pair of distributed virtual volumes; and
a backup component performing intra-site data migrations within each data center of the data centers using local live migration, and combining the inter-site data migrations using the migratable cluster relay stations and the intra-site data migrations such that that data migrations among the plurality of data centers can be performed exclusively using synchronous transmission even if a distance between source and target data centers exceeds synchronous limits of the distributed volume protocol.

8. The system of claim 7 wherein the stretched volume system comprises a metro-scale virtualization system for storage clusters of the clustered system.

9. The system of claim 8 wherein the local live migration comprises a system encapsulating an entire state of a virtual machine by a set of files stored on the network storage media and transferring an execution state of the virtual machine rapidly from a source computer server to a destination server computer.

10. The system of claim 7 wherein the distributed virtual volumes between pairs of data centers of the plurality of data centers effectively form a single distributed virtual volume accessible by all data centers of the plurality of data centers.

11. The system of claim 7 wherein the synchronous limits comprise at least one of a distance exceeding 100 kilometers, or a round-trip time of data transfer in excess of 10 milliseconds.

12. The system of claim 7 further comprising an optimization component performing at least one routing optimization, load balancing, or least distance algorithm to optimize the combining of the inter-site and intra-site data migrations.

13. A computer program product, comprising a non-transitory computer-readable medium having a computer-readable program code embodied therein, the computer-readable program code adapted to be executed by one or more processors to perform multi-site migration of active virtual machines by executing instructions implementing a method comprising:
performing inter-site data migrations among a plurality of data centers separated by metropolitan-scale distances using a distributed volume system and a stretched cluster system to migrate the data synchronously within the distance and time latency limits defined by the distributed volume protocol;
wherein the distributed volume system comprises a clustered system using a distributed virtual volume as network storage media for the data migrations, wherein a cluster comprises a plurality of highly available and fully redundant enterprise-scale backup engines, each supporting on the order of thousands of virtual volumes that are accessible by all data centers of the plurality of data centers; and
wherein the inter-site data migrations are performed by setting up distributed virtual volumes between pairs of data centers of the plurality of data centers to form migratable data clusters, and deploying pairs of migratable clusters as relay stations between each pair of distributed virtual volumes to link three data centers through the pair of distributed virtual volumes; and
performing intra-site data migrations within each data center of the data centers using local live migration; and
combining the inter-site data migrations using the migratable cluster relay stations and the intra-site data migrations such that that data migrations among the plurality of data centers can be performed exclusively using synchronous transmission even if a distance between source and target data centers exceeds synchronous limits of the distributed volume protocol.

14. The computer-program product of claim 13 wherein the method further comprises performing at least one routing optimization, load balancing, or least distance algorithm to optimize the combining of the inter-site and intra-site data migrations.

* * * * *